United States Patent

[11] 3,575,243

| [72] | Inventors | Alexander H. Mark<br>Brookfield;<br>Maynard E. Walberg, Waukesha, Wis. |
|---|---|---|
| [21] | Appl. No. | 759,154 |
| [22] | Filed | Sept. 11, 1968 |
| [45] | Patented | Apr. 20, 1971 |
| [73] | Assignee | Allis-Chalmers Manufacturing Company<br>Milwaukee, Wis. |

[54] FIELD CULTIVATOR
4 Claims, 4 Drawing Figs.

[52] U.S. Cl. .................................................. 172/710,
172/96, 172/711
[51] Int. Cl. ...................................................... A01b 35/24
[50] Field of Search ........................................... 172/40,
264, 705, 710, 711, 96

[56] References Cited
UNITED STATES PATENTS

| 2,054,129 | 9/1936 | Kelsey .......................... | 172/96 |
| 2,199,954 | 5/1940 | Kelsey .......................... | 172/96 |
| 2,888,993 | 6/1959 | Dunning ........................ | 172/15 |
| 3,246,704 | 4/1966 | Hidehisa Honda et al. ... | 172/96 |
| 3,414,252 | 12/1968 | Frager et al. .................. | 267/153 |

*Primary Examiner*—Robert E. Pulfrey
*Assistant Examiner*—C. Coughenour
*Attorneys*—Kenneth C. McKivett, Charles L. Schwab and Robert B. Benson

ABSTRACT: A field cultivator equipped with rubber cushions positioned between tool shanks and supporting frames for providing a flexible mounting of the tool shanks permitting the tool shanks to flex in any direction.

PATENTED APR 20 1971

3,575,243

Inventors
Alexander H. Mark
Maynard E. Walberg
By Kenneth *[illegible]*
Attorney

FIELD CULTIVATOR

An object of this invention is to provide a ground working tool in the nature of a field cultivator in which rubber cushions are mounted between the shank and tool bar thus letting the shank flex in all directions. This mounting gives the shank a very effective vibrating action insuring good soil penetration and working of the soil.

Another object of the invention is to provide a field cultivator which operates relatively quiet.

A further object of this invention is to provide a long life cultivator without pivot joints or wear areas and has lower manufacturing costs.

A further object of this invention is to provide a field cultivator with ground working tools which are so mounted from the tool bar that the field cultivator can be readily backed up should the need for such action arise.

A further object is to provide a field cultivator with resiliently mounted ground working tools which are capable of absorbing forces from any direction ordinarily encountered in field operations.

A further object of this invention is to provide a field cultivator with ground working tools which are so mounted from the tool bar that the tools will flex equally well either fore or aft.

In the prior art with field cultivators using conventional metal springs, it is possible for the cultivator to dig too deeply into soft ground and get stuck. This then requires backing up of the cultivator which process involves flexing the individual shanks in the opposite direction. The metal springs are not designed for this type of operation and accordingly, undesirable results often happen during such backing up process. The present invention solves this problem by providing resilient joints which can flex in any direction and these joints lend themselves to readily flexing when the cultivator is being backed up with no deleterious results to the cultivator.

Also in the prior art field cultivators with conventional metal springs were very objectionable both from a noise view point and a wear and breakage view point. As these prior art cultivators would go along a field a continual pounding or clacking of the the tool holders against their support was very annoying to the operator plus the fact that this continual pounding resulted in excess wear and breakage.

The present invention solves these problems by providing a resilient joint between tool and support so that the tool when flexed and released does not return to a rigid limit position but may overtravel as permitted by an all direction flexible support.

Furthermore, because this improved mounting does not have a rigid limit position as shown in the prior art an improved vibrating action of the tool is obtained thus resulting in better soil working.

Many other objects as well as advantages and uses of the invention will become apparent and understood after reading the following description and claims and after viewing the accompanying drawings in which:

Figure 1:
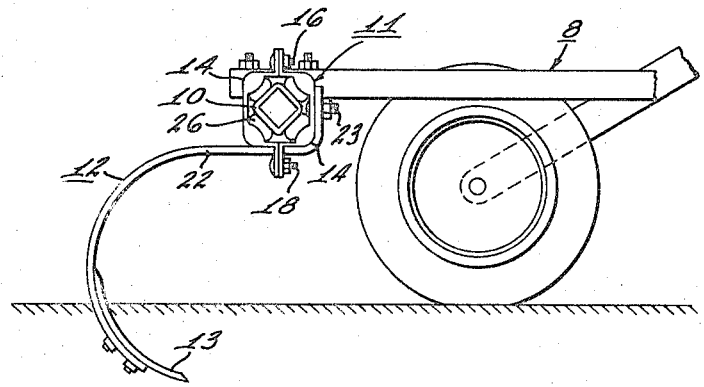
FIG. 1 is a side elevation of a portion of a field cultivator embodying the invention.

Referring now to FIG. 1 of the drawings, a wheeled ground working implement 8 is seen having a cross frame bar 10 of rectangular cross section, it being understood that in implements of this type a series of tool shanks would be mounted from this bar by appropriate fastening members, and that more than one crossbar could be used. It is understood that the invention could just as readily be embodied in a tractor mounted implement. The present drawing shows only one shank mounting assembly 11 of each such a series supporting a shank 12 which has soil working tool 13 attached at the lower end thereof. The upper end of shank 12 is connected to bar 10 by means of assembly 11.

Shank mounting assembly 11 (see FIG. 2) includes a pair of identical members 14 which are positioned adjacent opposite sides of bar 10 and members 14 are retained in position about bar 10 by means of upper bolts 16 and nuts 17 and lower bolts 18 and nuts 19. The lower portion of members 14 are pierced as at 21 (see FIG. 3) to provide openings through which the upper portion 22 of shank 12 is slidably received. The midportion of members 14 are provided with openings through which bolt 23 extends for connecting the upper end 24 of shank 12 to one of the members 14.

Figure 2:
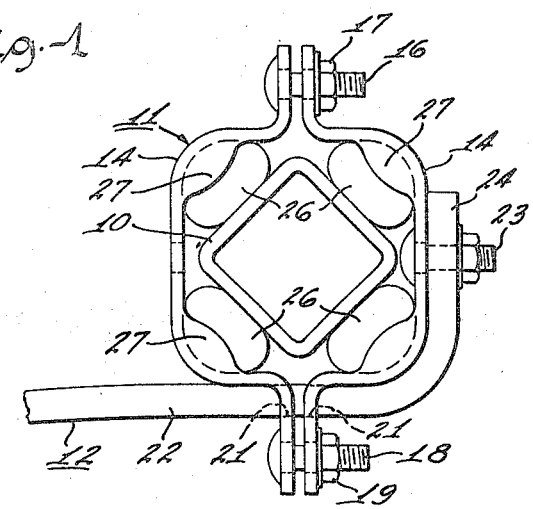
FIG. 2 is an enlarged view of a portion of the field cultivator shown in FIG. 1.
Figure 3:
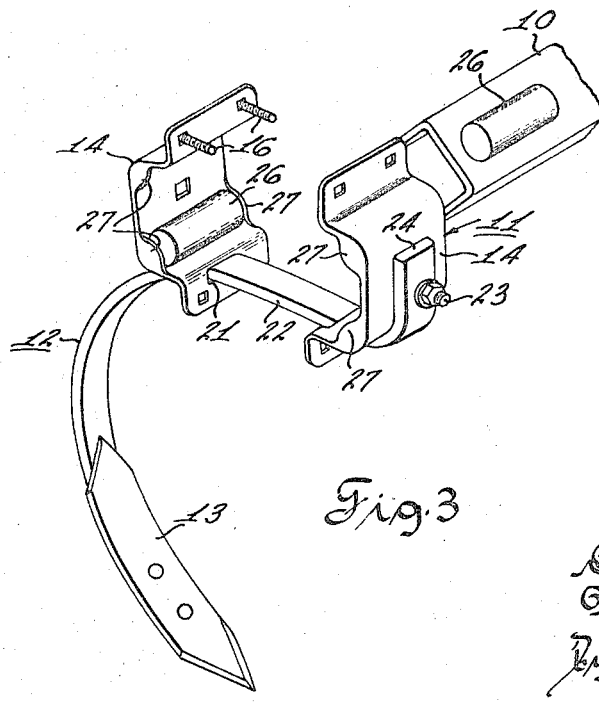
FIG. 3 is an exploded view of the mechanism shown in FIG. 2.

Interposed between tube 10 and members 14 are four rubber cylinders 26 (see FIGS. 2 and 3). These cylinders are of a length substantially equal to the width of members 14. Members 14 are provided with turned over edge portions 27 which retain the cylinders in their desired positions when the shank 12 is moved out of its normal position resulting in cylinders 26 being compressed between tube 10 and members 14. Nuts 17 and 19 can be tightened to provide a desired amount of preload on rubber cushions 26. In other words, a tightening of nuts 17 and 19 compresses rubber cylinders 26 between members 14 and tube 10 and thus resiliently connecting shank 12 to tube 10.

From the foregoing it is believed apparent that shank 12 can be moved in any direction (as a result of contacting the ground or obstructions in it during normal use) and when the obstruction is past or the ground is offering less resistance the energy stored in cylinders 26 will return the shank to its normal position as shown in FIG. 1. This construction not only permits fore and aft movement of the shanks but also lateral movement. However, there are no stop means provided to limit the return movement of shank 12 as in the prior art; in fact, if it is desired to back up the implement while the shank is stuck in the ground, the present arrangement will permit resilient movement of the shank in the opposite direction.

Part of the ability of this type of implement to do a good job of cultivating is its vibrating ability and because no stop is provided, it is believed that the present embodiment will provide a more efficient vibrator and better cultivating action while reducing noise and breakage.

While cylinders 26 have been described as being rubber cushions, it is obvious that other elastic materials such as plastics could be used in place of rubber.

Figure 4:
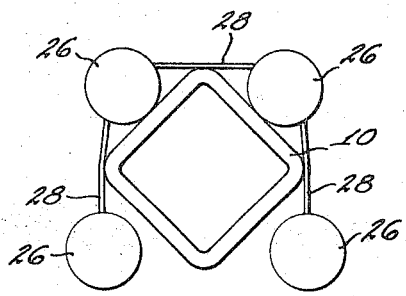
FIG. 4 is a side elevation of field cultivator frame showing how the rubber cushion members could be constructed to make assembly of the joints easier.

If desired, cylinders 26 (see FIG. 4) could be made with membranes 28 connecting four cylinders 26 for aiding in the assembly of the individual shank mounting assembly. These membranes 28 would be of the proper dimension to provide the desired spacing between cylinders.

The embodiments of the invention in which an exclusive property or privilege is claimed are defined as follows:

We claim:

1. In combination in a ground working tool, a nonrotatable transversely extending support member provided with a diamond-shaped cross section having four sides, a pair of identical clamp members adjustably joined together in surrounding relation to said support member, said clamp members being joined to each other at positions above and below points of said diamond-shaped cross section to provide a generally square-shaped cross section having four sides with the upper and lower sides extending generally horizontal and the other two sides extending vertically, resilient means interposed between said clamp members and said support member for permitting a relative resilient resisted movement of said clamp members in all directions, said resilient means comprising a rubber member positioned between each side of said support member and the adjacent two sides of said clamp members, adjustable means for moving said clamp members toward or away from each other to vary the resilience of said rubber members, a tool shank connected to a vertical side of one of said clamp members and to the lower sides of both said clamp members for movement therewith, and a ground engaging tool connected to said tool shank.

2. In combination in a ground working tool, a nonrotatable transversely extending support member provided with a cross section having four sides, a pair of identical clamp members adjustably joined together in surrounding relation to said support member, resilient means interposed between said clamp members and said support member for permitting a relative resilient resisted movement of said clamp members in all directions, said resilient means comprising a rubber member positioned between each side of said support and said identical clamp members, adjustable means for moving said clamp members toward or away from each other to vary the resilience of said rubber members, each of said rubber members being cylindrical and presenting a circumferential surface to said clamp members and to said support member, measured membranes connecting and spacing said rubber members from each other for aiding in assembling same between said clamp members and said support member, a tool shank connected to said clamp members for movement therewith, and a ground engaging tool element connected to said tool shank.

3. In combination as recited in claim 2 and wherein said clamp members are provided with turned over portions contacting end portions of said cylindrical rubber members for limiting elongation of said rubber members when the resilience of said rubber members is being varied.

4. In combination as recited in claim 1 and wherein said clamp members are provided with turned over portions contacting end portions of said rubber members for limiting elongation of said rubber members when the resilience of said rubber members is being varied.